(12) United States Patent  (10) Patent No.: US 8,164,281 B2
Warton  (45) Date of Patent: Apr. 24, 2012

(54) LUMINAIRE SYSTEM AND METHOD

(76) Inventor: Thomas Warton, Sonoma, CA (US)

( * ) Notice: Subject to any disclaimer, the term of this patent is extended or adjusted under 35 U.S.C. 154(b) by 406 days.

(21) Appl. No.: 12/509,711

(22) Filed: Jul. 27, 2009

(65) Prior Publication Data

US 2010/0026215 A1 Feb. 4, 2010

Related U.S. Application Data

(60) Provisional application No. 61/085,685, filed on Aug. 1, 2008.

(51) Int. Cl.
*H05B 39/06* (2006.01)
*H05B 41/04* (2006.01)
*H05B 41/18* (2006.01)

(52) U.S. Cl. ......... 315/362; 315/158; 315/160; 315/246
(58) Field of Classification Search .......... None
See application file for complete search history.

(56) References Cited

U.S. PATENT DOCUMENTS

| 7,405,523 B2* | 7/2008 | Wilhelm et al. | 315/291 |
| 2008/0258556 A1* | 10/2008 | Ewing et al. | 307/23 |
| 2009/0121652 A1* | 5/2009 | Kang et al. | 315/297 |

* cited by examiner

*Primary Examiner* — Anh Tran
(74) *Attorney, Agent, or Firm* — Antero & Tormey LLP; Pete Tormey; Richard Moerschell

(57) ABSTRACT

A device comprising a solid state or mechanical switch coupled to a first connector and a second connector and at least one lighting device such as an LED light source wherein when power is applied to the first connector, the switch is operable to direct power to the lighting device and to a portion of the pins of the second connector. By constructing the connectors as similar, but with opposite genders, the connectors can be disposed on a circuit assembly to allow for daisy chaining a series of luminaire assemblies together. The connectors may be Ethernet connectors and the switch may be operable through control signals coupled to the Ethernet connector such that a smart power controller operating using power over Ethernet (POE) can operate to control the light sources.

15 Claims, 3 Drawing Sheets

LUMINAIRE SYSTEM AND METHOD

This application claims the benefit of provisional patent application No. 61/085,685 filed on Aug. 1, 2008 which is incorporated herein by reference.

BACKGROUND

There are many factors that drive the market for luminaires and lighting systems. One of the most important drivers is the ability to save energy. Conventionally several techniques have been employed to save energy for lighting systems. For example, using light emitting diodes to replace incandescent lamps. Other technologies include motion detectors and other sensors that turn lamps on or off based on the presence of people in the illuminated area. These and other means primarily focus on saving energy.

Modernly people have also adapted microprocessors in an attempt to solve the problem of maximizing lighting efficiency. However, basic building blocks of microprocessor controlled lighting systems have not been fully developed, especially in the area of light emitting diode (LED) technology. As LED's gain in lighting efficiency there is an increasing market demand for smart tools and technologies to take advantage of these latest developments.

Many of the recent developments in lighting technology involve energy efficiency. Processor control technology promises to further increase energy efficiency, however, energy efficiency involves more than mere operation of a luminaires The entire supply chain for lighting systems has the potential for increased efficiency. This includes manufacturing, assembly and installation.

SUMMARY

Disclosed herein is a device comprising a solid state or mechanical switch coupled to a first connector and a second connector and at least one lighting device such as an LED light source wherein when power is applied to the first connector, the switch is operable to direct power to the lighting device and to a portion of the pins of the second connector. By constructing the connectors as similar, but with opposite genders, the connectors can be disposed on a circuit assembly to allow for daisy chaining a series of luminaire assemblies together. The connectors may be Ethernet connectors and the switch may be operable through control signals coupled to the Ethernet connector such that a smart power controller operating using power over Ethernet (POE) can operate to control the light sources.

The use of a processor controlled solid-state switch provides for power sensing of the assemblies and for remote control operation with the affect of providing energy-efficient control of the luminaire, programmable power regulation and light control.

DESCRIPTION

Figure 1:
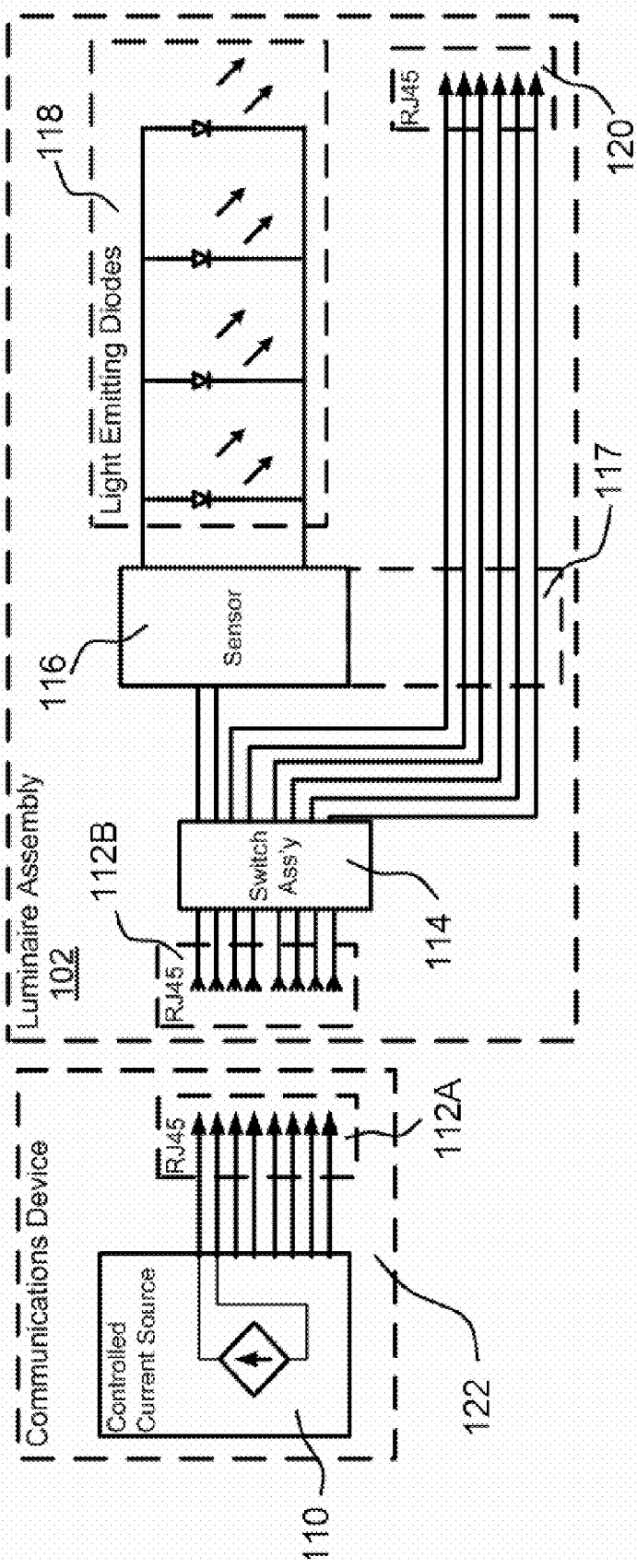
FIG. 1 shows a functional block diagram of one aspect of a lighting system.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows a functional block diagram of one aspect of a lighting system. A controlled current source 110 may a microprocessor controlled circuit providing one or more constant current sources. Each of these current sources can be controlled to operate in tandem or independently. For example, the current source 110 can be controlled to operate only during certain times during the day. The controlled current source 110 may also be coupled to standard lighting features such as dimmers and ambient light sensors to determine the optimal current output. The current output is applied to a jack assembly 112 (shown as 112A and 112B). The jack assembly 112 could be any assembly capable of delivering current from the controlled current source 110 to the switch assembly 114. The inventors contemplate using a standard RJ45 connector on standard Cat5 cabling, but other connectors and cabling may be employed. For example, a larger load may require larger diameter conductors than normally employed in a Cat5 cable. The RJ45 connector generally consists of eight wires set into four pairs, but may be configured differently.

The current output from the connector 112 is applied to the switch assembly 114. The switch assembly provides direction for switching the current to one or more light sources located on the luminaire assembly 102 or for switching the current to the output connector 120. The switch assembly 114 may switch any pair of wires from connector 112 to the light source on the luminaire assembly 102. And the switch assembly 114 may also switch to differing pairs (or pin numbers) on connector 120. For example, the first pair of wires from switch 112 may be directed to the luminaire assembly 102, while the second pair of wires from connector 112 may be coupled to the first pair of wires on the output connector 120. The switch assembly may be comprised of one or more mechanical switches, jumper blocks, soldered jumpers on a printed circuit board and the like so that the switch has the effect of connecting or disconnecting differing electrical connections.

The current switched through the switch assembly 114 is applied to an optional sensor 116. The sensor 116 could be any number of conventionally available sensors used in the lighting industry, for example, infrared motion detectors or ambient light detectors. The sensor 116 would interrupt or reduce the current through the sensor 116 when the sensor 116 detects the condition for which it is designed. The current that passes through the sensor 116 is applied to one or more light emitting diodes 118. These light emitting diodes 118 could be high intensity light emitting diodes of the kind typically found in an LED-based luminaires Note, that although the lighting system of FIG. 1 shows an LED lighting device, other light source such as fluorescence, and incandescent may also be employed. In operation, the sensor 116 would detect motion and a supply the current to the light emitting diodes. Alternatively the sensor 116 could detect high ambient light and prevent current from reaching the light emitting diodes 118.

The sensor 116 could be extended 117 to include operation on current passing to the output connector 120. Thus several devices similar to luminaire assembly 102 could be connected in series drawing power through the series of RJ45 connectors. Connected through the output connector 120. Should sensor 116 detect motion, sensor 116 could ensure that power is applied to light emitting diodes 118 and that power is applied to the remaining pins on the connector 120. Likewise if the sensor 116 detect a condition that would require suspending current to devices attached to the output connector 120, it would curtail the supply of a current to the output connector 120.

The luminaire assembly 102 could also be constructed without the switch assembly and without the sensor. Thus the first pair of connectors from connector 112 passes to light emitting diodes 118 and the remaining three pairs of wires from connector 112 pass directly to connector 120. Likewise a single luminaire assembly 102 could be connected through the output connector 120 to a plurality of devices similar to the luminaire assembly 102. The first luminaire assembly 102 would provide the switching and the sensor capability as a master device and slave devices would be connected through the output connector 120.

The one having skill in the art would recognize that a single luminaire assembly 102 could be powered from a pair of wires using a standard RJ45 connector thereby leaving other pairs of wires available to perform other functions. Thus the luminaire assembly 102 could be operated as part of a standard Ethernet connection provided the Ethernet equipment also provides the controlled current source 110.

The controlled current source could be replaced with either a standard or a controlled voltage source. This would also entail the addition of a power limiting device in series with the light emitting diodes 118, for example a resistance element (not shown). Also, the light emitting diodes 118 may be connected in series to provide a more uniform current to each diode.

Likewise one having skill in the art would recognize that the controlled current source 110 could be integrated with another electronic device 122 such as an Ethernet router or wireless access point. Thus the controlled current source 110 could be supplied from standard equipment likely to be found in an office environment, and power to the light emitting diodes 118 could be transferred using CAT5 cabling for an office environment. Additionally, the Luminaire system and method could be implemented using Power over Ethernet (POE).

Power over Ethernet (POE) has been implemented in IEEE standard 802.3af. 802.3af. The standard provides for the ability to supply an endpoint with 48V DC at up 350 mA or 16.8 W. The endpoint must be capable of receiving power on either the data pairs [Mode A] (often called phantom power) or the unused pairs [Mode B] in 100Base-TX. POE can be used with any Ethernet configuration, including 10Base-T, 100Base-TX and 1000Base-T. According to the standard, power is only supplied when a valid POE endpoint is detected by using a low voltage probe to look for the POE signature on the endpoint. One having skill in the art would recognize that the invention as disclosed herein could be effectuated with a low voltage probe. For example, this process could be performed by applying a low current limited DC voltage from electronic device 122 to connector 112 between the transmit and receive pairs of an Ethernet system. Devices which meet the standard will have a 35 k Ohm resistance apparent across the transmit and receive pairs. Power might only be applied to the connector if the proper load is detected.

POE power is typically supplied in one of two ways, either the host Ethernet switch provides the power, or a "midspan" device is plugged in between the switch and endpoints and supplies the power. No special cabling is required. A "phantom power" technique may be used so that the powered pairs may also carry data. This permits its use not only with 10BASE-T and 100BASE-TX, which use only two of the four pairs in the cable, but also with 1000BASE-T (Gigabit Ethernet), which uses all four pairs for data transmission.

In view of the foregoing, a luminaire as disclosed herein may be effectuated as part of a computer network wherein power is supplied to an Ethernet router (or other device) from a local power source. The router would combine digital data with a current supply. The router may include control functions as described above. The router may also provide direct control of a luminaire assembly in conjunction with its digital communication protocol. Thus the luminaire may operate as part of a digital network providing control of the lighting system such that a network administrator could control the luminaire. An Ethernet cable could be run from the router, to the luminaire wherein power for the LEDs would be supplied. Digital signals could be provided to the output connector 120 such that additional computing devices as well as other light source assemblies could be connected in series.

The connectors could be effectuated using 8 position 8 conductor connectors, conventionally called Ethernet connectors or often called RJ45 connectors.

The inventors also contemplate that the switch assembly may be a solid-state switch assembly such that control wires (not shown) from one of the connectors direct the action of the switch assembly in selecting which LEDs to supply with power and which pins of a connector to direct power to. A design of this sort may be effectuated with a sold state relay or any of a family of commercially available solid state power switches. Commercially available sold state power switches may employ pulse width modulation techniques to vary the amount of power to the LEDS, in effect acting as a light dimmer or other control circuitry. Using POE and control wires over an Ethernet connector would allow for network control of lighting systems.

In a similar manner the solid-state switch assembly may include a processor coupled to a memory circuit. Additionally a current and/or voltage sensor could be coupled to the processing device. This would allow for real-time feedback of the power use of the system. Processor-based semiconductor devices are known conventionally, and are manufactured with analog to digital conversion circuitry that may be coupled to sense circuitry. Further, the switch assembly may be manufactured form discrete components to effectuate a similar result. By way of example, a processor with memory may be coupled to solid state multiplexers having the affect of allowing the processor to control the interconnection between the first connector 112B and the second connector 120.

In operation a processing device would sense the power usage of the assembly and communicate that information to other assemblies that may be coupled to one of the connectors. This would have the effect of measuring the total power used by an assembly or group of assemblies that constitute a system. Since total power use is limited by POE standards, a processor-based switch assembly would provide for limiting total power drawn in the event too many assemblies are connected together.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effectuate such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
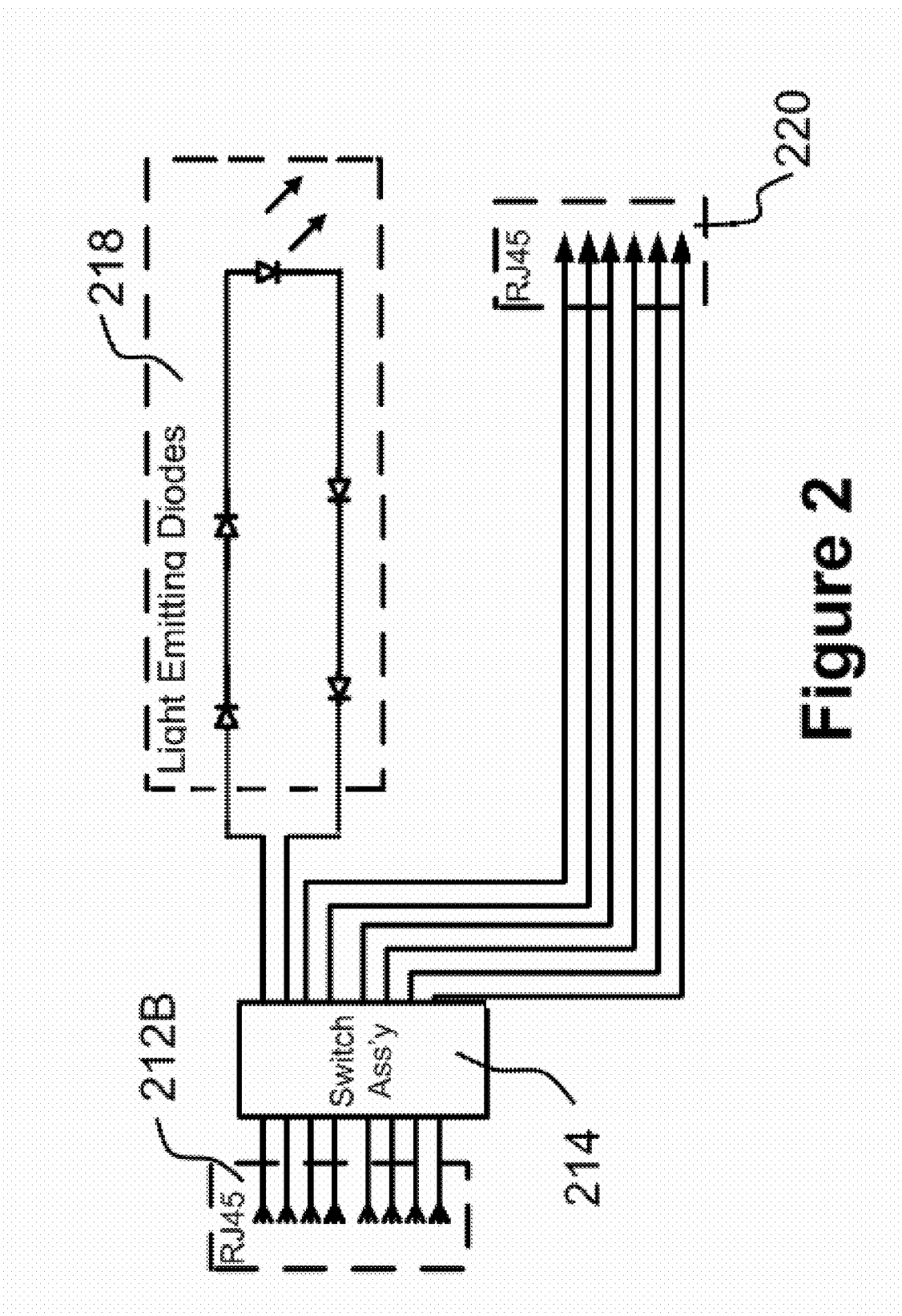
FIG. 2 illustrates a luminaire assembly using LEDs in series.

FIG. 2 illustrates a luminaire assembly using LEDs in series. In the FIG. 2 is a connector 212B, an optional switch assembly 214, a second connector 220 and one or more LEDs 218. In the FIG. 2, a power source (not shown) such as a variable or constant voltage or current source enters the circuit through connector 212B. From the connector 212B it is supplied to the LEDs 218 by way of the optional switch assembly 214. If the switch assembly is included, it directs the power source to the appropriate LEDs 218 and to the connector 220. Alternatively, without the switch assembly 214, the power is supplied directly to the LEDs 218 and to the connector 220.

Any combination of power sources could be coupled to the connectors 212B. In operation, some of the pins on connector 212B would be coupled to LEDs 218 disposed on a single circuit board. Additional pins from connector 212B are selectively coupled to connector 220 for further connection to other power loads. This has the effect of allowing multiple circuit boards to be coupled together to effectuate a multi-part LED luminaires Either by disposing the coupling between connectors 212B to connector 220, or through the use of the switch assembly 214, multi-part and multi-length luminaire LED assemblies may be effectuated. It is contemplated that connector 212B would be of a similar type but opposite gender than connector 220, so that if they were mounted on a circuit board or other assembly, they could be coupled together.

By way of example, if connector 212B was an 8-pin connector coupled to 4 constant current sources, then two of the pins would be used to power LEDs 218 on a single circuit board or circuit assembly. The remaining 6 pins (3 power sources) would be selectively coupled to the connector 220. Additional circuit boards, similar to the one shown in the FIG. 2, could be coupled to connector 220, each board drawing power for its LEDs through one pair of wires from a power source. This has the effect of allowing 4 power sources (coupled to 8 wires) to be used to power 4 circuit boards each operating one of more LEDs 218. With the use of switch assembly 214, the circuit assemblies could all be identically manufactured and, at installation, the switch assembly configured to selectively direct the appropriate power to the LEDs 218 on each board.

Figure 3:
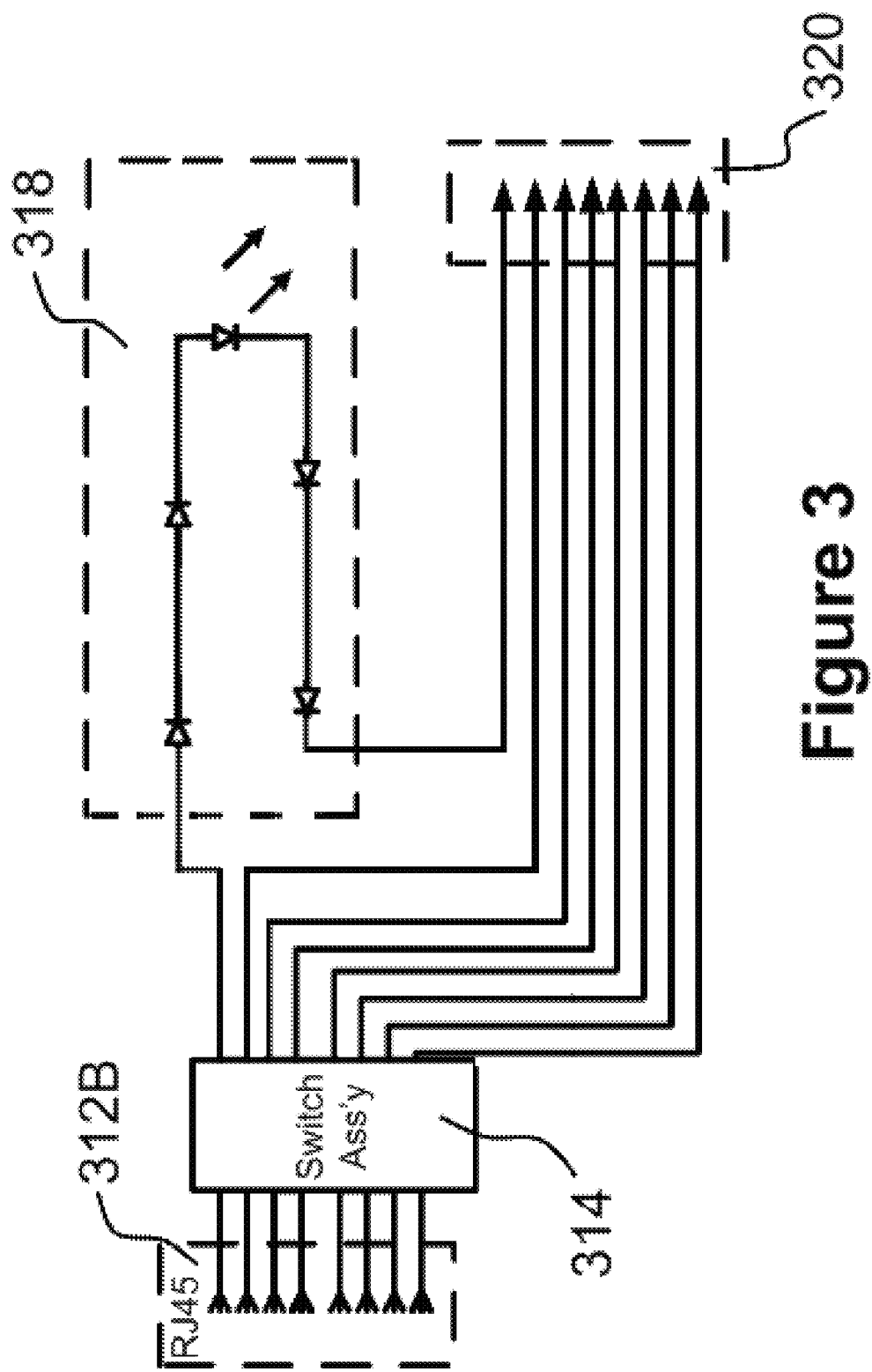
FIG. 3 illustrates a luminaire assembly using LEDs in series for connection to another set of LEDs.

FIG. 3 illustrates a luminaire assembly using LEDs in series for connection to another set of LEDs. In the FIG. 3 is a connector 312B, a second connector 320 and one or more LEDs connected in series 318. In the FIG. 3, a power source (not shown) such as a variable or constant voltage or current source enters the circuit through connector 312B. From the connector 312B power is supplied to one end (either cathode or anode) of the LEDs 318. The other end of the LEDs is directed to connector 320. If a similar circuit is connected to connector 320, a second set of LEDs could be powered with appropriate grounding. This has the effect of powering LEDs on multi circuit assemblies from the same power source.

In the above referenced drawings, assemblies may be constructed using different colors or numbers of LED and assemblies may be coupled together to effectuate different lighting designs.

In the FIG. 3 the switch assembly may be a simple as jumper connectors, or switches. However, the switch assembly may also be constructed of discreet electronic parts to provide more advanced controls. For example, by dedicating wires for control operation, a switch assembly can be constructed to communicate with other switch assemblies on similarly constructed luminaire assemblies. By way of example, conventional circuits may be used to sense current used on the luminaire assembly and transmit that sense information "downstream" to another luminaire assembly coupled by way of one of the connectors. The use of conventional analog adders would allow a luminaire assembly to "sense" upstream luminaire assemblies having the affect of controlling the action of the switch assembly in response to upstream current usage. For example, power could be coupled to differing pins on the connectors depending on where in string of luminaire assemblies the current assembly is located.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A device comprising:
    a solid-state switch said switch coupled to a processor and a memory;
    a first connector coupled to the switch;
    a second connector coupled to the switch; and
    at least one lighting device coupled to the switch,
    wherein when power is applied to the first connector, the solid-state switch is operable to direct power to the lighting device and to a portion of the pins of the second connector, and communicate through either the first or second connector.

2. The device of claim 1 wherein the lighting device is either an LED or a fluorescent lamp.

3. The device of claim 1 wherein the first connector is of a first gender type and the second connector is of the opposite gender type.

4. The device of claim 1 further including:
    at least one sensing circuit, said circuit including at least one of a voltage sensing circuit, a current sensing circuit or a power sensing circuit,
    wherein the solid-state switch transmits and receives information from the sensing circuit.

5. A method comprising:
    coupling a first connector to a switch;
    coupling a second connector to the switch;
    coupling a light source to the switch
    coupling a first connector of a first luminaire assembly to a second connector of a second luminaire assembly, and
    operating the switch to direct power from the first connector to the light source and to the second connector.

6. The method of claim 5 wherein the light source is mounted to a circuit board to create a luminaire assembly.

7. The method of claim 5 wherein the lighting source is either an LED or a fluorescent lamp.

8. The method of claim 5 wherein the switch is a mechanical switch or a jumper block.

9. The method of claim 5 wherein the switch is a solid state switch having controls coupled to either the first or second connector.

10. The method of claim 5 further including:
sensing electrical information, said electrical information including at least one of a voltage or a current, and
communicating the electrical information through either the first connector or the second connector.

11. A luminaire system comprising:
a circuit assembly including:
at least one light source mounted on said circuit assembly;
a first connector electrically coupled the light source and to a switch, and
a second connector, operable opposite in gender to the first connector, said second connector electrically coupled to a portion of the first connector;
said first connector and said second connector are operable to mate with Ethernet connectors,
wherein the switch is operable to selectively direct electricity from pins on the first connector to pins on the second connector.

12. The luminaire of claim 11 wherein the first connector and second connector are disposed about the circuit assembly such that a first connector on a similarly constructed second luminaire assembly would electrically and physically couple with the second connector on the luminaire assembly.

13. The luminaire of claim 11 wherein either the first connector or the second connector is coupled to a low voltage probe.

14. The device of claim 11 wherein the switch is a processing device coupled to a memory and operable to:
direct power to the lighting device and to a portion of the pins of the second connector, and
communicate through either the first or second connector.

15. The device of claim 14 further including:
at least one sensing circuit, said circuit including at least one of a voltage sensing circuit, a current sensing circuit or a power sensing circuit,
wherein the switch transmits and receives information from the sensing circuit.

* * * * *